United States Patent [19]

Lawford et al.

[11] 4,375,764
[45] Mar. 8, 1983

[54] LIQUID LEVEL SYSTEM

[75] Inventors: Victor N. Lawford; Robert R. Austin, both of Pasadena, Calif.

[73] Assignee: ITT, New York, N.Y.

[21] Appl. No.: 262,500

[22] Filed: May 11, 1981

[51] Int. Cl.³ ............................................. G01F 23/16
[52] U.S. Cl. ........................................ 73/301; 73/299; 340/614
[58] Field of Search ................. 73/301, 299; 340/618, 340/614

[56] References Cited

U.S. PATENT DOCUMENTS

| | | | |
|---|---|---|---|
| 1,733,616 | 10/1929 | McNeill | 73/299 |
| 3,038,336 | 6/1962 | Peters | 73/301 |
| 4,109,531 | 8/1978 | Lawford et al. | 73/301 |
| 4,332,166 | 6/1982 | Lawford | 73/299 |

*Primary Examiner*—Howard A. Birmiel
*Attorney, Agent, or Firm*—T. E. Kristofferson; T. L. Peterson; A. D. Stolzy

[57] ABSTRACT

A liquid level system employs a pair of vertically spaced sensors in a tank such as a boiler. Each sensor includes a pair of bellows. The first bellows is enclosed by a protective enclosure while the second bellows is exposed to the interior of the tank. The first bellows of the two sensors are interconnected and filled with a liquid forming substance, such as an alkali metal, which is in liquid phase at high temperatures, while the second bellows of each sensor and the enclosure for the first bellows are interconnected and filled with a second liquid-forming substance, such as a metal alloy, which is essentially inert. A transducer is connected to one of the second bellows which produces an electrical output signal proportional to the difference between the pressures at the locations of the second bellows and, thus, the level of liquid in the tank.

19 Claims, 2 Drawing Figures

LIQUID LEVEL SYSTEM

BACKGROUND OF THE INVENTION

This invention relates generally to a liquid level system and, more particularly, to such a system employing an apparatus for detecting the level of liquid in a tank which is capable of operating at relatively high temperatures and pressures.

Reference is made to FIG. 18 of my U.S. Pat. No. 3,853,006 which discloses a liquid level system embodying a liquid level measuring apparatus comprising a pair of vertically spaced bellows mounted inside a tank and interconnected by a conduit. The two bellows and the conduit are filled with water or oil providing a reference column for the liquid level measuring apparatus. A transducer, such as a linear variable displacement transformer, is coupled to the lower bellows. The transducer produces an electrical output signal which is proportional to the difference between the pressures at the locations of the upper and lower bellows and, therefore, the level of water in the tank.

If the foregoing tank operates at very high temperatures and pressures, such as at 650° F. and 2200 psi, and pressure is lost in the tank, the water or oil used as the reference column will become super-heated and vaporize, thereby causing the bellows to rupture and therefore rendering the liquid level measuring apparatus inoperative. It is the object of the present invention to overcome this shortcoming of the aforementioned liquid level measuring arrangement.

SUMMARY OF THE INVENTION

According to a principal aspect of the present invention, a liquid level measuring system is provided similar to the prior art system described previously herein except that the water or oil reference column filling the two bellows and conduit interconnecting the same is replaced by a reference column of a liquid-forming substance, such as NaK, which remains in liquid phase at very high operating temperatures of the tank, even if pressure in the tank is lost. Since NaK is highly reactive with water, if the bellows ruptures, a hazardous condition could result if the NaK leaks into the interior of the tank. Accordingly, in accordance with another feature of the invention, each of the NaK filled bellows is enclosed by a protective enclosure having a second bellows thereon which is exposed to the interior of the tank. The interior of each protective enclosure and second bellows is filled with an inert substance which will prevent the NaK from reaching the tank in the event the first bellows ruptures. The transducer of the apparatus is connected to one of the second bellows. In a preferred embodiment of the invention, the materials which fill the first and second bellows of the assembly are in solid phase at ambient temperature but in liquid phase at the normal operating temperature of the tank.

DESCRIPTION OF THE PREFERRED EMBODIMENT

Figures 1, 2:
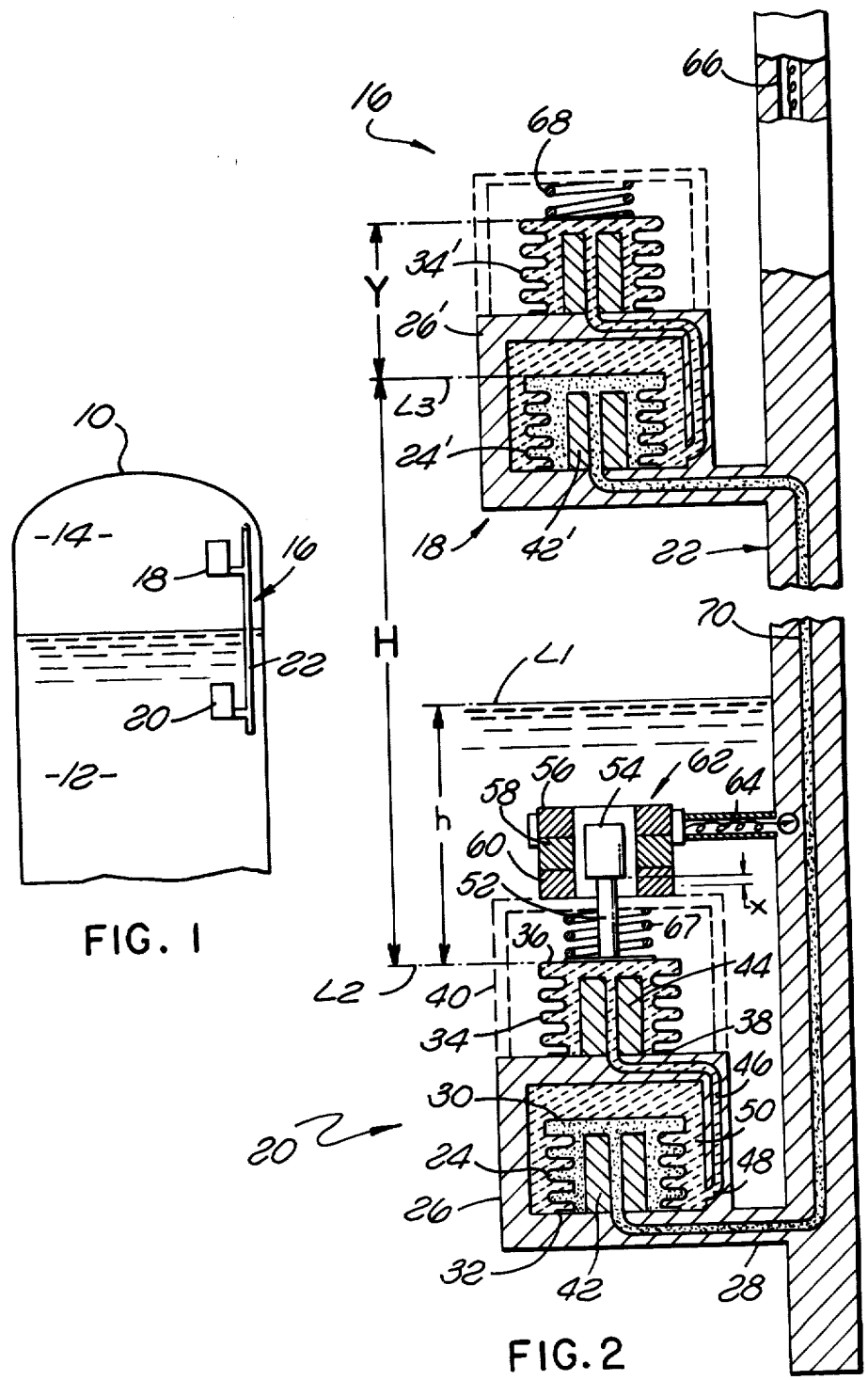
FIG. 1 is a diagrammatic view of a liquid level system embodying the liquid level measuring apparatus of the present invention.
FIG. 2 is an enlarged, vertical sectional view of the liquid level measuring apparatus illustrated in FIG. 1.

Reference is now made to FIG. 1 of the drawing in which the liquid level system of the invention is shown somewhat schematically, and comprises a tank 10, such as a boiler, which contains water 12 and steam 14 above the water. The liquid level measuring apparatus of the present invention, generally designated 16, comprises an upper sensor 18 and a lower sensor 20 mounted in vertical spaced relation on a frame 22. As shown, normally the upper sensor 18 is located above the water level while the lower sensor 20 is immersed in the water in the tank 10.

Reference is now made to FIG. 2 of the drawing which illustrates the liquid level measuring apparatus 16 of the present invention in detail. In FIG. 2, the water level in the tank is indicated at L1. The working range of the water in the tank extends from a low level L2 to a high level L3, and is indicated by the arrow designated "H".

The sensor 20 comprises a bellows 24 enclosed by a rigid protective housing 26 which is fixedly connected to the frame 22 by a strut 28. The bellows 24 includes an upper free movable end 30 and a lower annular lip 32 which is fixedly secured, such as by welding, to the lower wall of the housing 26.

A second bellows 34 is mounted on the exterior of the housing 26. The second bellows includes an upper movable free end 36 and a lower lip 38 which is fixed to the upper wall of the housing. A screen 40 mounted on the housing 26 encloses the upper bellows to protect the same, yet leaves the bellows exposed to the interior of the tank. Liquid displacing elements 42 and 44 on the lower and upper walls of the housing 26 extend into the bellows 24 and 34, respectively, to reduce the volume therein. A passage 46 extends vertically downwardly through the element 46, transversely across the upper wall of the housing 26 and downwardly through the side wall thereof to a port 48 adjacent to the lower end of the chamber 50 defined between the wall of the housing and the bellows 24. Thus, the passage 46 provides flow communication between the interior of the bellows 34 and the chamber 50 surrounding the bellows 24.

The upper sensor 18 is identical to the lower sensor 20 to the extent the lower sensor is described hereinbefore, and the same reference numerals primed will be utilized hereinafter to designate the parts of the sensor 18 which correspond to those in sensor 20.

A shaft 52 is fixed to the free end 36 of bellows 34 and extends upwardly through the screen 40 of the sensor 20. An armature 54 is mounted on the end of the shaft. The armature is surrounded by three windings 56, 58 and 60 of a linear variable displacement transformer, generally designated 62. The leads 64 for the transducer 62 extend upwardly through a passage 66 in the frame 22 to a suitable meter or controller (not shown) outside of the tank which measures the difference in pressures at the respective locations of the sensors 18 and 20 which is a function of the level of liquid in the tank. The transducer 62 may be identical to the transducer 31 disclosed in my prior U.S. Pat. No. 3,853,006, the disclosure of which is incorporated herein by reference. A calibration spring 67 is provided between the upper wall of the screen 40 and the upper end of the bellows 34. The sensor 18 embodies a similar spring 68 which compensates for density changes of the reference column of the apparatus.

A passage 70 extends downwardly through the element 42' in sensor 18, through the frame 22, and upwardly through the element 42 in sensor 20 providing flow communication between the interiors of the two bellows 24 and 24' in the sensors 20 and 18, respectively. Normally, such passage and the bellows would be filled with water or oil which forms the reference column for the liquid level measuring apparatus. If the tank is operated at relatively high temperatures and pressures, such as 650° F. and 2200 psi, and if pressure in the tank is lost, it is possible for the reference column liquid to superheat and vaporize thereby causing the bellows to rupture. In order to avoid this problem, in accordance with the present invention, the reference column is formed of a substance which remains in liquid phase at such relatively high temperatures even if the pressure in the tank is lost. Suitable substances which are liquid at such temperatures, and will not vaporize if pressure is lost, are alkali metals, such as sodium and potassium, (or NaK alloys) or sulphur, or other relatively light-weight metals or non-metals. These substances have the advantage that they are in solid phase at room temperature, thus protecting the bellows during handling or installation of the apparatus 16, yet are in liquid phase in the normal operating temperature range of the tank. For example, NaK is in liquid phase through temperatures of 30° F. to 1200° F. NaK is particularly suitable since it has a specific gravity of 0.9, approximately the specific gravity of water.

Since NaK and most of the other reference column substances discussed above are highly reactive with water, the bellows containing the same are mounted within the protective enclosures or housings 26 and 26' of the sensors. The housings and bellows 34, 34' are filled with a substance that is essentially inert and therefore, will not react with water if such bellows were to rupture. Substances which are inert and in liquid phase at the relatively high temperature conditions mentioned above are low melting point alloys, such as soft solder or Woods metal. For example, an alloy of 50% bismuth, 25% lead and 25% tin is particularly advantageous since it has a melting point of 187° F. Like NaK, this alloy is in solid phase at ambient temperature. Thus, both bellows in the two sensors are filled with substances which are in solid phase at ambient temperature but are in liquid phase at the working temperature of the tank.

It is noted that NaK, for example, is less dense than the metal alloy mentioned above. Thus, if the bellows 24 in sensor 20, for example, were to rupture, the NaK would flow upwardly in the chamber 50. If the passage 46 opened directly into the top of the chamber 50, the NaK would float into the upper bellows 34 where it could escape into the interior of the tank if that bellows also ruptured. For that reason, the port 48 of the passage 46 opens into the bottom of the chamber 50 so that even if the bellows 24 ruptured for some reason, the NaK therein would float to the top of the chamber and could not flow into the upper bellows 34.

It is noted that the top of the bellows 34 of sensor 20 is located at the low water level L2 of the tank while the upper end of the bellows 24' of sensor 18 is located at the high water level L3 of the tank. The arrow designated "h" indicates the distance between the low water level L2 and the actual level of water L1 in the tank. The arrow designated "Y" indicates the distance between the high water level L3 and the top of the bellows 34' of the sensor 18. Movement of the armature 54 is indicated by the arrow "X".

In operation, the bellows 24 has an internal hydrostatic pressure $P_1$:

(1) $P_1 = $ (H inches × specific gravity of B) + (Y inches × specific gravity of C) + reactor pressure where B is the liquid filling the bellows 24 and 24' (such as NaK) and C is the liquid filling the bellows 34 and 34' (low melting point alloy).

The external hydrostatic pressure $P_2$ on the bellows 24 is (2) $P_2 = $ (h inches × specific gravity of water) + (Y inches × specific gravity of C) + reactor pressure and the differential pressure $dP = P_1 - P_2$ is (3) $dP = $ (H inches × specific gravity of B) − (h inches × specific gravity of water).

The differential pressure acting on the bellows 24 effective area A develops a force F:

(4) $F = dP \times A$ and this force applied against the calibration spring 67 results in a motion X of the armature 54 of the transducer 62.

(5) $X = $ (Force/$K_T$) where $K_T = $ the system spring rate (the spring rate of the calibration spring plus the four bellows).

Thus, the transducer 62 produces a voltage signal which is proportional to the height h above the low water level L2, thereby providing a measure of the level of liquid in the tank.

If desired, the transducer 62 may be coupled to the upper diaphragm 34' of the upper sensor 18 rather than to the corresponding diaphragm of the lower sensor to maintain the transducer above the water level in the tank.

What is claimed is:

1. An apparatus for measuring the level of liquid in a tank which may operate at a relatively high temperature and pressure comprising:
   (a) lower and upper sensors being adapted to be mounted adjacent to a relatively low liquid level and a relatively high liquid level, respectively, in a tank;
   (b) each of said sensors comprising:
     (1) first, second and third chambers;
     (2) a first movable pressure sensitive barrier separating said first and second chambers;
     (3) a fixed wall separating said second and third chambers;
     (4) said third chamber embodying a second movable pressure sensitive barrier adapted for exposure to the interior of the tank;
     (5) passageways providing flow communication between said second and third chambers;
   (c) a conduit providing flow communication between said first chambers of said lower and upper sensors;
   (d) a first liquid filling said first chambers and said conduit;
   (e) a second liquid different from said first liquid filling said second and third chambers of said lower and upper sensors; and
   (f) means connected to one of said second movable barriers for producing an electrical output signal proportional to the difference between the pressures at the respective locations of said second movable barriers, said difference being a function of the level of liquid in the tank.

2. An apparatus as set forth in claim 1 wherein:

each said sensors include a rigid housing enclosing said first movable barrier and providing therein said first and second chambers on the opposite sides of said first movable barrier; and said second movable barrier is mounted on the exterior of said housing.

3. An apparatus as set forth in claim 1 wherein:

each said first and second movable barriers is a bellows.

4. An apparatus as set forth in claim 3 including:

a fixed liquid displacing element extending into each of said bellows to minimize the liquid volume thereof.

5. An apparatus as set forth in claim 1 including:

a vertical frame supporting said lower and upper sensors; and said conduit extends through said frame.

6. An apparatus as set forth in claim 1 wherein:

both of said first and second liquids remain in liquid phase to a temperature of at least 650° F. even if pressure in the tank is lost.

7. An apparatus as set forth in claim 1 wherein:

said first liquid is selected from the group consisting of sodium, potassium and NaK alloy.

8. An apparatus as set forth in claim 1 wherein:

said first incompressible liquid is NaK.

9. An apparatus as set forth in claim 1 wherein:

said second liquid is essentially inert.

10. An apparatus as set forth in claim 1 wherein:

both of said first and second liquids are in solid phase at ambient temperature and in liquid phase at the operating temperature of the tank.

11. An apparatus for measuring the level of liquid in a tank comprising:

(a) lower and upper sensors being adapted to be mounted adjacent to a relatively low liquid level and a relatively high liquid level, respectively, in a tank;

(b) each said sensors comprising:
  (1) a rigid housing and first and second bellows;
  (2) said first bellows being mounted in said housing having a movable end spaced from the wall of said housing defining a chamber therebetween;
  (3) said second bellows being mounted on the exterior of said housing;
  (4) passageways providing flow communication between the interior of said second bellows and said chamber;

(c) a conduit providing flow communication between the interiors of said first bellows;

(d) a first liquid filling the interiors of said first bellows and said conduit;

(e) a second liquid different from said first liquid filling the interiors of said second bellows and said chambers; and (f) means connected to one of said bellows for producing an electrical output signal proportional to the difference between the pressures at the respective locations of said two second bellows, said difference being a function of the level of liquid in the tank.

12. A liquid level system which may operate at a relatively high temperature and pressure comprising:

(a) a tank having a relatively low liquid level and a relatively high liquid level;

(b) lower and upper sensors mounted inside said tank adjacent to said relatively low liquid level and said relatively high liquid level, respectively;

(c) each said sensor comprising:
  (1) first, second and third chambers;
  (2) a first movable pressure sensitive barrier separating said first and second chambers;
  (3) a fixed wall separating said second and third chambers;
  (4) said third chamber embodying a second movable pressure sensitive barrier exposed to the interior of the tank;
  (5) passageways providing flow communication between said second and third chambers;

(d) a conduit providing flow communication between said first chambers of said lower and upper sensors;

(e) a first liquid filling said first chambers and said conduit;

(f) a second liquid different from said first liquid filling said second and third chambers of said lower and upper sensors; and (g) means connected to one of said second movable barriers for producing an electrical output signal proportional to the difference between the pressures at the respective locations of said second movable barriers, said difference being a function of the level of liquid in the tank.

13. A liquid level system as set forth in claim 12 wherein:

each said sensors includes a rigid housing enclosing said first movable barrier and providing said fixed wall.

14. A liquid level system as set forth in claim 12 wherein:

each said first and second movable barriers is a bellows.

15. A liquid level system as set forth in claim 12 wherein:

both of said first and second liquids are in solid phase at ambient temperature and are in liquid phase at said operating temperature even if pressure in the tank is lost.

16. A liquid level system as set forth in claim 12 wherein:

said first liquid is highly reactive with water; and said second liquid is essentially inert.

17. A liquid level system as set forth in claim 16 wherein:

both of said first and second liquids are metals.

18. An apparatus for measuring the level of liquid in a tank which may operate at a relatively high pressure and a temperature of about 650° F. comprising:

(a) lower and upper sensors being adapted to be mounted adjacent to a relatively low liquid level and a relatively high liquid level, respectively, in a tank;

(b) each said sensor including a pressure sensitive diaphragm defining a chamber therein;

(c) a conduit providing flow communication between said chambers of said lower and upper sensors;

(d) a liquid filling said chambers and said conduit;

(e) said liquid remaining in liquid phase at said temperature even if pressure in the tank is lost; and (f) means operatively associated with one of said diaphragm means for producing an electrical output signal proportional to the difference between the pressures at the respective locations of said two diaphragm means, said difference being a function of the level of liquid in the tank.

19. An apparatus as set forth in claim 18 wherein:

each said sensor includes a protective enclosure for said diaphragm;
said protective enclosure including second pressure sensitive diaphragm adapted for exposure to the interior of the tank;

a second liquid filling said enclosure and being essentially inert; and
said first-mentioned liquid is highly reactive with water.

* * * * *